(12) United States Patent
Nakano et al.

(10) Patent No.: US 7,685,874 B2
(45) Date of Patent: Mar. 30, 2010

(54) THERMAL TYPE FLOW SENSOR WITH A CONSTRICTED MEASURING PASSAGE

(75) Inventors: Hiroshi Nakano, Hitachi (JP);
Masamichi Yamada, Hitachinaka (JP);
Masahiro Matsumoto, Hitachi (JP);
Izumi Watanabe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/779,128

(22) Filed: Jul. 17, 2007

(65) Prior Publication Data
US 2008/0016959 A1 Jan. 24, 2008

(30) Foreign Application Priority Data
Jul. 21, 2006 (JP) .............................. 2006-199591

(51) Int. Cl.
*G01F 1/68* (2006.01)
(52) U.S. Cl. .................................. 73/204.21; 73/204.22
(58) Field of Classification Search .............. 73/204.21, 73/204.26
See application file for complete search history.

(56) References Cited

U.S. PATENT DOCUMENTS

| | | | | |
|---|---|---|---|---|
| 4,448,070 A | * | 5/1984 | Ohyama et al. | 73/204.21 |
| 4,833,912 A | * | 5/1989 | Ohta et al. | 73/204.26 |
| 4,934,190 A | * | 6/1990 | Lee | 73/204.26 |
| 5,220,830 A | * | 6/1993 | Bonne | 73/204.21 |
| 5,291,781 A | * | 3/1994 | Nagata et al. | 73/204.26 |
| 5,533,412 A | * | 7/1996 | Jerman et al. | 73/204.26 |
| 5,804,720 A | * | 9/1998 | Morimasa et al. | 73/204.26 |
| 6,079,264 A | * | 6/2000 | Yamakawa et al. | 73/204.26 |
| 6,318,170 B1 | * | 11/2001 | Renninger et al. | 73/204.26 |
| 6,516,785 B1 | * | 2/2003 | Nakada et al. | 73/204.26 |
| 6,591,674 B2 | * | 7/2003 | Gehman et al. | 73/204.21 |
| 6,615,655 B1 | * | 9/2003 | Sakai et al. | 73/204.26 |
| 6,655,207 B1 | * | 12/2003 | Speldrich et al. | 73/204.21 |
| 6,799,456 B2 | * | 10/2004 | Ito et al. | 73/204.26 |
| 6,988,399 B1 | * | 1/2006 | Watanabe et al. | 73/204.26 |

(Continued)

FOREIGN PATENT DOCUMENTS

CN 1805159 A 7/2006

(Continued)

OTHER PUBLICATIONS

Chinese Patent Office Search Report issued Sep. 26, 2008.

*Primary Examiner*—Harshad Patel
(74) *Attorney, Agent, or Firm*—Brundidge & Stanger, P.C.

(57) ABSTRACT

A thermal type flow sensor includes a base portion provided along the direction of a fluid flowing through a main passage, and a sensor element mounted on the base portion and having an exothermic resistor formed on a substrate for detecting the fluid flow rate. The base portion has a rectangular recessed portion in which the sensor element is fixed so that the surface of the detecting portion of the sensor element is positioned lower than an upper edge of the recessed portion. A wall portion of the measuring passage facing the sensor element is constricted. The exothermic resistor is disposed along the fluid passage and spaced away from the upstream side upper edge of the recessed portion and cannot be substantially affected by a fluid flow disturbance due to a step portion formed between the upper edge of the recessed portion and the detecting portion surface.

9 Claims, 3 Drawing Sheets

U.S. PATENT DOCUMENTS

| | | |
|---|---|---|
| 7,269,999 B2 | 9/2007 | Nakano et al. |
| 2004/0163463 A1* | 8/2004 | Ito et al. .................. 73/204.26 |
| 2007/0089504 A1* | 4/2007 | Hanzawa et al. ......... 73/204.26 |

FOREIGN PATENT DOCUMENTS

| | | |
|---|---|---|
| JP | 10-300546 | 11/1998 |
| JP | 2000-310552 | 11/2000 |
| JP | 2001-004420 | 1/2001 |
| JP | 2001-255188 | 9/2001 |
| JP | 2002-236044 | 8/2002 |
| JP | 2002-357465 | 12/2002 |
| JP | 2003-090750 | 3/2003 |
| JP | 2003-270015 | 9/2003 |
| JP | 2003-315126 | 11/2003 |
| JP | 2005-315740 | 11/2005 |

* cited by examiner

THERMAL TYPE FLOW SENSOR WITH A CONSTRICTED MEASURING PASSAGE

BACKGROUND OF THE INVENTION

The present invention relates to a thermal type flow sensor equipped with a sensor element having an exothermic resistor formed on a substrate as a detecting member for detecting the flow rate of a fluid such as air passing through an air intake passage of vehicle-mounting internal combustion engine. In particular, the present invention relates to a thermal type flow sensor which is designed to exhibit improved accuracy in the measurement of flow rate.

As for the flow sensor for detecting the intake air flow of an internal combustion engine to be mounted on a vehicle, a thermal type air flow sensor which is capable of directly measuring the mass flow rate is mainly employed.

In recent years, there has been proposed an idea to manufacture the sensor element of thermal type flow sensor on a semiconductor substrate such as a silicon substrate by making use of micromachine techniques. In the thermal type flow sensor of this semiconductor type, an exothermic resistor and a temperature-sensing resistor are formed on a thin film portion having a thickness of several microns formed on a semiconductor substrate. Since this sensor is formed of a thin film, the heat capacity thereof is small, thereby making it possible to realize high-speed response and low power driving. Further, it is possible, through fine working, to easily fabricate a structure which is capable of detecting a difference in temperature between the upstream side and the down stream side of the exothermic resistor to thereby determine if the flow is forward flow or backward flow.

Since the thermal type flow sensor of semiconductor type is formed of a plate-like sensor element, the accuracy of measurement will be greatly affected when any disturbance is caused to generate in the flow of fluid around the sensor element. Therefore, the problem is how to create the structure that cannot be badly affected by the disturbance in flow of fluid as described above.

As for the prior art which aims at overcoming the aforementioned problem, there is known a thermal type flow sensor which is described in JP Patent Application H10-300546 (1998). The thermal type flow sensor shown in this publication is designed so as to minimize the error of measurement that may be caused to occur due to the disturbance of flow at the edge portion of the base portion for mounting the sensor element or at the edge portion of the substrate of sensor itself.

In most of the thermal type flow sensor of semiconductor type, the sensor element is mounted on the inner wall of passage for measurement or measuring passage (base portion) where a fluid is enabled to flow through or on the inner wall of sub-passage (the inner wall of measuring passage) which is provided in a main passage. As for the specific state in the mounting of the sensor element, a rectangular recessed portion is formed at the base portion and the sensor element is fitted inside the recessed portion and adhered thereto by making use of an adhesive and the like.

On the occasion of mounting the sensor element inside the recessed portion, the surface (detecting portion) of sensor element should preferably be made flush with the surface of the inner wall of measuring passage. Depending on the manufacturing conditions however, the surface of sensor element may be protruded or depressed from the surface of the inner wall of measuring passage (forming a step portion), thus creating non-uniform surface.

For example, when the sensor element is protruded from the surface of inner wall of measuring passage, the disturbance of flow (peeling) is caused to generate at the edge portion of sensor element. As a result, true fluid flow may be caused to differ from the fluid flow around the sensor element, thus generating an error of measurement. In order to minimize this measurement error, the thermal type flow sensor described in the aforementioned patent publication is constructed such that the exothermic resistor of the sensor element is disposed away from the edge portion of sensor element where the peeling thereof may be generated. However, in order to secure a sufficient isolation distance from the edge portion of sensor element, the surface area of sensor element is required to be increased, inevitably leading to an increase in manufacturing cost.

Furthermore, when the sensor element is protruded from or made flush with the surface of inner wall of measuring passage, dusts that have been intermingled with the fluid may impinge against the thin film portion of sensor element, thus raising a problem that the sensor element is caused to fracture.

Further, when the sensor element is depressed from the surface of inner wall of measuring passage, the disturbance of flow (peeling) may be caused to occur due to the step portion between the surface of inner wall of measuring passage and the surface of sensor element.

Whereas, in the case of the thermal type flow sensor described in the aforementioned JP patent publication, the aforementioned problem of non-uniformity on the occasion of mounting the sensor element is not taken into account. Even if a step portion is caused to generate due to the protrusion or depression of the surface of sensor element from the surface of inner wall of measuring passage, the problem to be raised by the step portion may be overcome by securing a sufficient distance between a peeling portion at the step portion and the exothermic resistor. However, this countermeasure would lead to substantial increase in area of the sensor element as described above, resulting in increase of manufacturing cost.

BRIEF SUMMARY OF THE INVENTION

The present invention has been accomplished with a view to overcome the aforementioned problems of the prior art and therefore, an object of the present invention is to provide a thermal type flow sensor which is capable of reducing the measurement error that may be caused due to the disturbance in flow of fluid and also of reducing the fracture of the sensor element that may be caused due to the impingement of dusts to the sensor element while making it possible to minimize the size of sensor element and without inviting any substantial increase of manufacturing cost.

With a view to achieve the aforementioned object, the thermal type flow sensor according to the present invention is constructed to have the following features.

Namely, according to one aspect of the present invention, there is provided a thermal type flow sensor which basically comprises: a base portion provided along the flowing direction of a fluid passing through a main passage; and a sensor element mounted on the base portion and equipped with an exothermic resistor formed on a substrate for detecting the flow rate of the fluid passing through main passage.

This thermal type flow sensor is further featured in that a rectangular recessed portion is formed in the base portion, that the sensor element is fixedly fitted in the recessed portion in a manner that the surface of detecting portion of the sensor element is positioned lower than an upper edge of the recessed portion, that a wall portion of measuring passage which is located to face the sensor element is constricted, and that the exothermic resistor is disposed along a passage of the fluid and spaced away from the upstream side upper edge of the recessed portion and cannot be substantially affected by a disturbance of flow of the fluid that may be caused to generate due to a step portion formed between the upper edge of the recessed portion and the surface of detecting portion of the sensor element.

As another aspect of the present invention, there is provided a thermal type flow sensor which basically comprises: a main passage having therein a sub-passage formed along a flowing direction of a fluid for enabling part of the fluid to pass therethrough; a base portion provided in the sub-passage and along the flowing direction of the fluid passing through a sub-passage; and a sensor element mounted on the base portion and equipped with an exothermic resistor formed on a substrate for detecting the flow rate of the fluid passing through main passage.

This thermal type flow sensor is further featured in that a rectangular recessed portion is formed in the base portion, that the sensor element is fixedly fitted in the recessed portion in a manner that the surface of detecting portion of the sensor element is positioned lower than an upper edge of the recessed portion, that a wall portion of measuring passage which is located to face the sensor element is constricted, and that the exothermic resistor is disposed along a passage of the fluid and spaced away from the upstream side upper edge of the recessed portion and cannot be substantially affected by a disturbance of flow of the fluid that may be caused to generate due to a step portion formed between the upper edge of the recessed portion and the surface of detecting portion of the sensor element.

In a preferable embodiment, the constricted portion is configured such that the cross-sectional area of the passage is gradually reduced from the upstream side upper edge of the recessed portion to the downstream side thereof and the exothermic resistor of sensor element is mounted on the downstream side of the narrowest portion in the constricted passage and away from the upstream side thereof.

In a more preferable embodiment, the step portion formed between the upper edge of the recessed portion and the surface of detecting portion of the sensor element is set in relation to a distance between the upstream side upper edge of the recessed portion and a center of the exothermic resistor in such a way as to satisfy an expression of: $L > D \cdot \alpha$, wherein L is a distance between the upstream side upper edge of the recessed portion and a center of the exothermic resistor; D is a depth of the step portion between the upper edge of the recessed portion and the surface of detecting portion of the sensor element; and $\alpha$ is an average gradient of the constricted portion.

In a more preferable embodiment, the center of the exothermic resistor is spaced away, along the flowing direction of fluid, from the upstream side upper edge of the recessed portion by a distance of 1.5 mm or more.

In a further preferable embodiment, the sensor element is mounted at a length of 3 mm or more as measured from the upstream side edge thereof to the downstream side edge thereof.

In a further preferable embodiment, the center of the exothermic resistor is off-set from the center of the sensor element toward the downstream side.

In a further preferable embodiment, eaves projecting over the sensor element and extending along the flowing direction of fluid is formed on the upstream side upper edge and/or the downstream side upper edge of the recessed portion.

In this case, the eaves is formed to have a tapered surface extending downward from the proximal end thereof.

In a further preferable embodiment, the sub-passage is provided with at least one constricted portion in a midway between the upstream end of the sub-passage and the recessed portion.

Followings are complementary explanation of the aforementioned various embodiments.

Generally, the semiconductor type sensor element is constructed such that a thin film portion is formed on the surface of silicon substrate, and that an exothermic resistor is formed on this thin film portion. As for the materials for the exothermic resistor, it is possible to employ not only impurity-doped monocrystalline silicon and impurity-doped polysilicon but also metals such as platinum. It is also possible to fabricate the exothermic resistor by making use of a substrate formed from ceramics or metals. The base portion is formed of a plate-like body made of resins, ceramics or metals and provided with a rectangular recessed portion. The base portion should preferably be of a planar configuration. Alternatively, the inner wall of main passage through which the fluid to be measured is permitted to pass may be utilized as a base portion and the recessed portion may be formed in this inner wall, thus enabling the sensor element to be installed therein. In this case, the region surrounding this recessed portion should preferably be planar in configuration.

The surface of the detecting portion of sensor element installed in the recessed portion of base portion should be lower than the level of the surface of the region surrounding this recessed portion (upper peripheral edge), thereby creating a step portion between the surface of the detecting portion of sensor element and the peripheral surface surrounding this recessed portion. On the occasion of fitting the sensor element in the recessed portion, an adhesive is coated on the underside surface of sensor element and then the sensor element is adhered to the recessed portion. In this case, the depth of the sensor element thus installed may scatter or vary by a magnitude of about ±20 μm. Therefore, the sensor element should preferably be installed in the recessed portion in such a manner that the surface of the sensor element is positioned at a level which is at least 20 μm lower than the surface of base portion. However, if it is possible to improve the adhesion accuracy, the aforementioned adjustment of depth may not be taken into account on the occasion of adhering the sensor element to the recessed portion.

The passage in which the sensor element is installed is constructed such that a constriction of passage is provided at a wall portion thereof which faces the sensor element. This constriction of passage is created near to the recessed portion of base portion so as to obtain the effect of compressing an air flow passing over this recessed portion. More specifically, this constriction of passage is configured such that the cross-sectional area of passage is made gradually smaller starting from the step portion formed on the upstream side of the recessed portion.

More specifically, the exothermic resistor (the center thereof) mounted on the sensor element should preferably be spaced away by a distance of at least 1.5 mm from the upper edge of the recessed portion of base portion. In the case of this embodiment, since a step is formed between the upstream side upper edge of the recessed portion of base portion and the surface of sensor element as well as between the downstream side upper edge of the recessed portion of base portion and the surface of sensor element, the exothermic resistor on the sensor element is positioned so as to keep it away from the step portion of the upstream side upper edge of the recessed portion by a distance of 1.5 mm or more. The exothermic resistor of the semiconductor type sensor element is employed for the purpose of detecting the heat release from the exothermic resistor due to the air flow or changes in temperature around the exothermic resistor due to the air flow, thereby making it possible to measure the flow rate of the air flow.

On the occasion of measuring the intake air flow of vehicle-mounting internal combustion engine, backward flow of fluid (air) may be occasionally caused to occur in the air inlet passage (main passage). In order to minimize any measurement error due to the disturbance of air flow even in the case of backward flow, the following countermeasures can be taken. Namely, even though the exothermic resistor is kept away from the step portion of the upstream side upper edge of the recessed portion by a distance of 1.5 mm or more in the aforementioned construction, it is further required that the exothermic resistor is kept away from the step portion of the downstream side upper edge of the recessed portion by a distance of 1.5 mm or more. In other words, the width (the length in the direction of flow) of the recessed portion of base portion is set to 3 mm or more and the exothermic resistor is arranged at the center of sensor element and, at the same time, the sensor element is positioned at the center of the recessed portion. By doing so, it is possible to cope with even on the occasion of backward flow.

In the case of the thermal type flow sensor where the measurement of backward flow is not required to be considered, the aforementioned countermeasure to secure a sufficient distance from the downstream side upper edge of the recessed portion may not be required to be undertaken. Therefore, the exothermic resistor may be disposed on the downstream side of sensor element in such a way that the position of exothermic resistor is off-set from the center of sensor element toward the downstream side, thereby making it possible to reduce the area of the sensor element.

The relationship between the exothermic resistor formed on the sensor element and the constriction formed at a wall portion of measuring passage which is located to face the sensor element should preferably be set as follows. Namely, the constricted portion to be formed on the wall portion that faces the sensor element should be configured in such a way that the cross-sectional area of the passage is gradually reduced from the upstream side upper edge of the recessed portion formed in the base portion to the downstream side thereof and that the exothermic resistor of sensor element is mounted on the downstream side of the narrowest portion in the constricted passage rather than the upstream side thereof.

Further, when the depth of the step portion formed between the surface surrounding the recessed portion and the surface of the sensor element is represented by "D", when the distance between the step portion (upstream side upper edge of the recessed portion) and the exothermic resistor formed on the sensor element is represented by "L", and when an average gradient of the constricted portion formed on a wall portion facing the sensor element is represented by "$\alpha$" (i.e. $\alpha=Y/X$, wherein Y is the height of slanted portion; and X is the length of slanted portion as measured along the direction of flow), they should be regulated so as to satisfy an expression of: $L>D\cdot\alpha$. By doing so, the disturbance (peeling) inflow of fluid that has been caused to occur due to the depth of step portion "D" can be suppressed and stabilized by the constricted portion. As a result, the measurement of flow rate by means of the exothermic resistor can be performed without being affected by the disturbance (peeling) in flow of fluid that may be caused to occur due to the depth of step portion "D".

When it is desired to measure very small flow rate by means of the thermal type flow sensor, the sensitivity of the sensor element would become insufficient, thus deteriorating the measurement accuracy. Therefore, it is preferable to additionally provide the flow sensor with a structure for accelerating the flow velocity in the sub-passage. More specifically, at least one constricted portion is provided between the inlet port (upstream end) of the sub-passage and the upstream end of the recessed portion, thus creating a sub-passage having a constricted passage which is located close to the upstream end of the recessed portion and more reduced in cross-sectional area as compared with the cross-sectional area of the inlet port of the sub-passage.

Although it is possible to accelerate the air flow by making use of the constricted portion provided on a wall portion facing the sensor element, if the gradient of this constricted portion is increased so as to sufficiently accelerate the flow velocity, peeling may be caused to generate in the flow due to this constricted portion, thus generating disturbance in the flow over the sensor element (the exothermic resistor). Therefore, it is preferable that the sub-passage is provided therein with a first constricted portion for accelerating the flow in the sub-passage and with a second constricted portion for suppressing the peeling due to the aforementioned step portion. In this case, there is not any particular limitation with respect to the configuration of the first constricted portion as long as the first constricted portion is located upstream of the sensor element and is capable of accelerating the flow velocity in the sub-passage. Further, it is preferable to provide the sub-passage with a section for stabilizing the disturbed flow that may be caused to occur due to the provision of the first constricted portion, this section being interposed between the first constricted portion and the second constricted portion. More specifically, an intermediate passage having a constant cross-sectional passage area is interposed between the first constricted portion and the second constricted portion.

According to the present invention, due to the provision of the constricted portion at a wall of measuring passage which is located to face the sensor element, it is now possible to suppress the disturbance (peeling) of fluid flow that may be caused to occur due to the step portion formed between the upper edge of the recessed portion and the surface of detecting portion of sensor element. As a result, it is possible to suppress the disturbance of fluid flow and turn it into a stabilized fluid flow at a region of passage over the exothermic resistor where measurement (detection) of flow rate is conducted. Because of this, it is now possible to execute the measurement of flow rate by means of the exothermic resistor without being affected by the disturbance (peeling) of fluid flow that may be caused to occur due to the step portion, thus making it possible to enhance the accuracy of flow rate measurement. In this case, due to the provision of the constricted portion, it is no longer required to increase the size of the sensor element. As a result, it is possible, without substantially inviting the increase of manufacturing cost, to minimize the measurement error that may be caused to occur due to the disturbance of fluid flow. Furthermore, due to the provision of the step portion, it is possible to minimize the damage to the sensor element that may be caused to occur due to the impingement or adhesion of dusts, etc.

DETAILED DESCRIPTION OF THE INVENTION

Next, specific embodiments of the thermal type flow sensor of the present invention will be explained with reference to drawings.

First Embodiment

Figure 1:
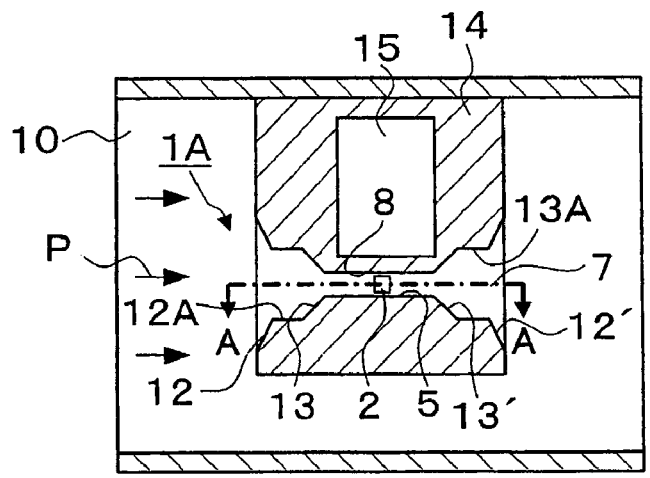
FIG. 1 is a cross-sectional view illustrating a state wherein the thermal type flow sensor is installed in a main passage according to a first embodiment of the present invention.
Figure 2:
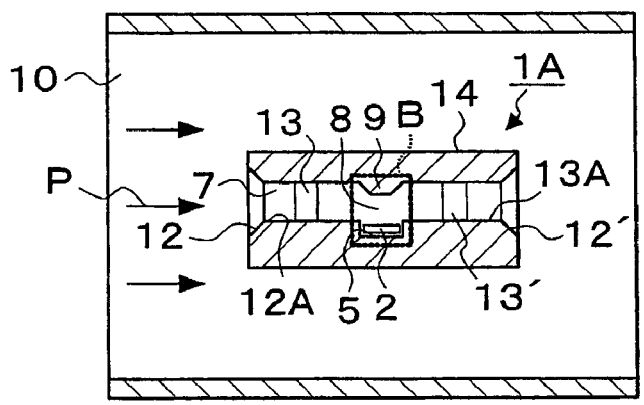
FIG. 2 is an enlarged cross-sectional view taken along the line A-A of FIG. 1.
Figure 3:
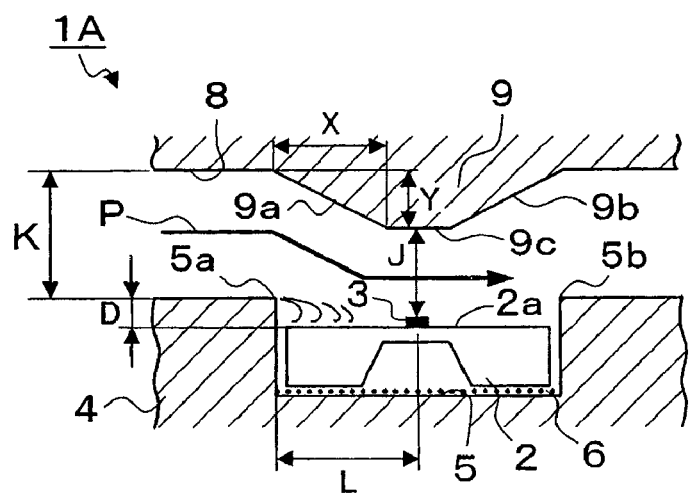
FIG. 3 is an enlarged view of the region "B" of FIG. 2.

FIG. 1 is a cross-sectional view illustrating a state wherein the thermal type flow sensor 1A according to a first embodiment of the present invention is installed in a main passage 10 (the air intake passage of vehicle-mounting internal combustion engine); FIG. 2 is an enlarged cross-sectional view taken along the line A-A of FIG. 1; and FIG. 3 is an enlarged view of the region "B" of FIG. 2.

The thermal type flow sensor 1A shown herein is provided therein with a sensor element 2 equipped with an exothermic resistor 3 which is formed on a substrate for detecting the flow rate of the fluid passing through a main passage 10, and also provided therein with a circuit board 15 on which electronic circuit components for detecting flow rate and a wiring pattern are formed. Further, the thermal type flow sensor 1A is further provided with a sensor housing 14 in which a sub-passage 7 having a rectangular cross-section is formed. This sensor housing 14 is mounted inside the main passage 10. By the way, the sensor element 2 is electrically connected, through wire bonding, with the circuit board 15.

The sub-passage 7 is provided to extend along the flow direction P of a fluid passing through the main passage 10 such that a portion of the fluid passing through the main passage 10 is enabled to enter into and pass through the sub-passage 7. This sub-passage 7 is constituted, mentioning in the order from the upstream side, by a fore-opening 12, a fore-passage 12A, a fore-constricted portion 13, a measuring passage 8, a rear-constricted portion 13', a rear passage 13A and a rear opening 12'.

The sensor element 2 is installed in the measuring passage 8.

Namely, a central lower portion of the measuring passage 8 in the sub-passage 7 is utilized as a base portion 4 for mounting the sensor element 2. A rectangular recessed portion 5 is formed in this base portion 4 and the sensor element 2 is fixedly fitted, by means of an adhesive 6, in the recessed portion 5 in such a manner that the surface of detecting portion of the sensor element 2 is positioned lower than an upper edge (upstream side edge 5a and downstream side edge 5b) of the recessed portion 5.

Further, a constricted portion 9 is provided at a wall portion of measuring passage which is located to face the sensor element 2 (a wall portion of measuring passage 8 immediately over the sensor element 2). The exothermic resistor 3 is disposed along a passage of the direction P of fluid flow and is spaced away from the upstream side upper edge 5a of the recessed portion 5 so that the exothermic resistor 3 cannot be substantially affected by a disturbance of flow of the fluid that may be caused to generate due to a step portion D formed between the upper edge 5a of the recessed portion 5 and the surface (upper surface) of detecting portion of the sensor element 2.

More specifically, the constricted portion 9 is shaped to have a reversed trapezoidal (isosceles trapezoidal) cross-section. Namely, the constricted portion 9 is constituted by a slanted portion 9a where the cross-sectional passage area is gradually reduced in the direction starting from the upstream side upper edge 5a of the recessed portion 5 to the downstream side, by a planar portion 9c which is parallel with the fluid flowing direction P, and by a slanted portion 9b where the cross-sectional passage area is gradually increased in the direction up to the downstream side upper edge 5b of the recessed portion 5. The exothermic resistor 3 is mounted on the downstream side of the narrowest portion (the planar portion 9c) in the constricted passage (the slanted portion 9a, the planar portion 9c and the slanted portion 9b) and away from the upstream side thereof.

In this embodiment, as shown in FIG. 3, the depth D of step portion is set to 20 μm or more, the height K of the measuring passage 8 which is located upstream of the constricted portion 9 is set to about 3 mm, and the height J of the narrowest portion (the planar portion 9c) is set to about 1.7 mm.

In this embodiment, the exothermic resistor 3 is spaced away, along the flowing direction P, from the upstream side upper edge 5a of the recessed portion 5 to such an extent that the exothermic resistor 3 cannot be substantially affected by a disturbance of flow of the fluid that may be caused to generate due to a step portion D (as described hereinafter, the distance L between the upstream side upper edge 5a of the recessed portion 5 and the center of the exothermic resistor 3 is set to 1.5 mm or more).

Followings are supplementary explanation about the construction described above and the explanation about the effects of the structure.

When a fluid is permitted to flow through the main passage 10, part of the fluid is permitted to enter into the sub-passage 7. The fluid that has been introduced into the sub-passage 7 is accelerated by the fore-constricted portion 13. Since the flow velocity in the measuring passage 8 can be accelerated especially at the time of low flow rate due to the provision of the fore-constricted portion 13, it is possible to enhance the sensitivity of the sensor element. The fluid that has been accelerated by the fore-constricted portion 13 is permitted to flow into the measuring passage 8. In this measuring passage 8, the disturbance (peeling) in flow of fluid is caused to generate due to the existence of the step portion D. However, due to the effects of the constricted portion 9 formed on a wall portion of passageway facing the recessed portion 5, the flow thus peeled can be suppressed.

Next, the advantages that can be derived from the step portion D will be explained. The fluid flowing through the main passage 10 is air in the case of the internal combustion engine to be mounted on a vehicle. However, the intake air flow passing through the main passage (air intake passage) 10 contains dusts, water, oil, etc. Since the sensor element 2 is provided with a thin film portion, this thin film portion may be fractured due to the impingement thereto of dusts included in the air. Further, the sensor element 2 may be contaminated due to the adhesion thereto of water or oil. In order to cope with these problems, the mounting position of the sensor element 2 is made lower than the wall surface of measuring passage, thus creating the step portion D. Due to the provision of this step portion D, the impingement or adhesion of dusts, etc. can be minimized.

However, due to the provision of the step portion D, there will be raised a problem that peeling is caused to generate in the flow of fluid. Although the peeling thus generated may be spontaneously vanished gradually as it moves toward the downstream side, if the exothermic resistor 3 is positioned at a location where the peeling has been already vanished, the sensor element 2 would become larger in chip size. Therefore, with a view to forcedly vanishing this peeling, the constricted portion 9 is provided at a wall portion of measuring passage which faces the sensor element 2. Due to the provision of this constricted portion 9, the peeled flow can be shrunk and vanished.

Figure 4:
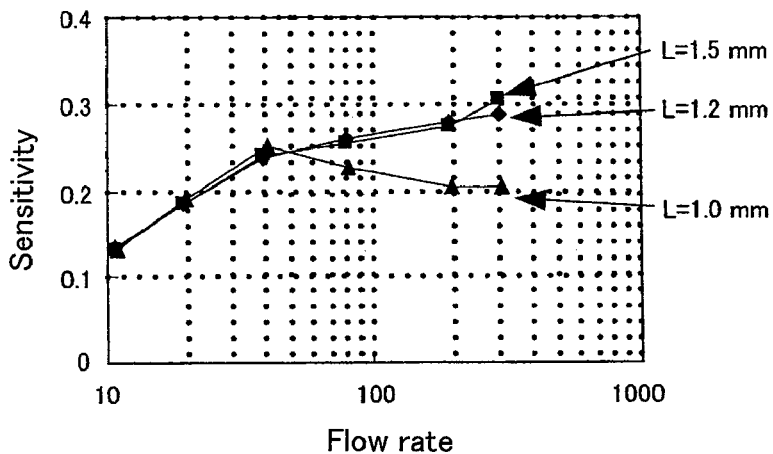
FIG. 4 is a graph illustrating the relationship between the flow rate in the main passage and the output of the sensor element.
Figure 5:
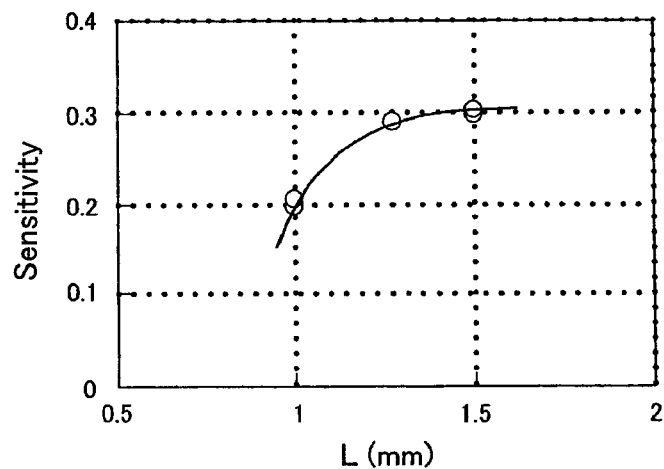
FIG. 5 is a graph illustrating the relationship between the output of the sensor element and the position of the exothermic resistor.

FIG. 4 shows the relationship between the flow rate in the main passage 10 and the output sensitivity of the sensor element 2 as the position of the exothermic resistor 3 is varied. Further, FIG. 5 shows the relationship between the sensitivity of sensor element at the high flow rate shown in FIG. 4 and the distance L from the upstream side upper edge 5a of the recessed portion 5 to the exothermic resistor 3 (center thereof) (see also FIG. 3). The peeling to be generated due to the step portion D would become a main cause for the deterioration of output sensitivity of sensor element especially at the region of high flow rate. In this case, when the L is set to 1 mm or less, the output sensitivity of sensor element at a high flow rate would be prominently deteriorated. Whereas, when the L is increased to 1.2 mm or 1.5 mm, the deterioration of sensitivity can be suppressed. When the L is increased to exceed 1.5 mm, the output sensitivity can be made approximately constant. Therefore, when the L is set to not less than 1.5 mm in the aforementioned structure, it is possible to prevent the output sensitivity of sensor element from being affected by the peeling in flow of fluid due to the provision of the step portion D.

In the case of the intake air employed in the engine for vehicle, since the pulsation is caused to occur prominently due to the changes in engine speed, backward flow may be caused to generate in the intake air. Therefore, it is required to minimize the influence of the disturbance (peeling) of fluid flow, even if the backward flow is caused to generate. In this case, it is preferable to keep the exothermic resistor 3 (the center thereof) away from the step portion located on the downstream side of the sensor element 2 by a distance of 1.5 mm or more. In other words, the size (in the direction of air flow) of the sensor element 2 should preferably be set to 3 mm or more and the exothermic resistor 3 is arranged at the center of sensor element. Further, it is also preferable to additionally provide another constricted portion (slanted portion 9b) on the downstream side of the sensor element 2, thereby obtaining a structure where the configuration on the upstream side of the sensor element 2 is symmetrical with the configuration on the downstream side thereof. In the case where the measurement of backward flow is not required to be considered, it is only required to consider the forward direction, so that the exothermic resistor is simply required to be disposed in such a way that the position of exothermic resistor is off-set from the center of sensor element 2 toward the downstream side, thereby making it possible to reduce the size of the sensor element.

Further, in order to suppress the peeling that has been generated at the step portion D by making use of the constricted portion 9, a constricted portion which at least corresponds to the step portion D is required to be formed. Namely, when an average gradient of the constricted portion 9 (the slanted portion 9a thereof) formed on a wall portion facing the sensor element 2 is represented by "α" (i.e. α=Y/X, wherein Y is the height of slanted portion; and X is the length of slanted portion as measured along the direction of flow), the distance "L" between the step portion D (upstream side upper edge 5a of the recessed portion 5) and the exothermic resistor 3 (the center thereof) formed on the sensor element 2 should be regulated so as to satisfy an expression of: L>D·α. By doing so, the disturbance (peeling) in flow of fluid that has been caused to occur due to the depth of step portion "D" can be suppressed and stabilized by the constricted portion 9. As a result, the measurement of flow rate by means of the exothermic resistor 3 can be performed without being affected by the disturbance (peeling) in flow of fluid that may be caused to occur due to the depth of step portion "D".

Second Embodiment

Figure 6:
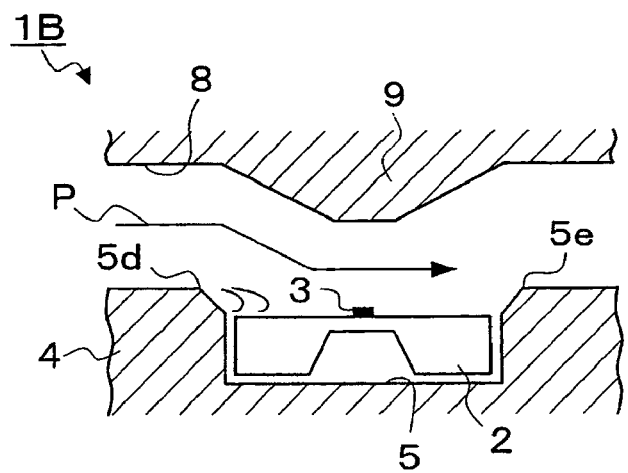
FIG. 6 is a cross-sectional view illustrating a main portion of the thermal type flow sensor according to a second embodiment of the present invention.

FIG. 6 shows a main portion of the thermal type flow sensor 1B according to a second embodiment of the present invention. In the thermal type flow sensor 1B of this embodiment, the components which correspond to those of the thermal type flow sensor 1A according to the first embodiment will be identified by the common symbols and differences in structure between these embodiments will be mainly explained in the following description. In this embodiment, the upper corner portion 5d on the upstream side of the recessed portion 5 formed in the base portion 4 as well as the upper corner portion 5e on the downstream side thereof is formed into a slanted surface (chamfered). Namely, the peeling to be generated due to the provision of the step portion would become larger as the configuration of passage is sharply changed. Therefore, the corner portions 5d and 5e of upper edges of the upstream and downstream sides of the recessed portion 5 are formed into a slanted surface, respectively, thereby enabling the configuration of passage to change gradually and hence making it possible to minimize the aforementioned peeling. By the way, these corner portions may be rounded off (having R).

Third Embodiment

Figure 7:
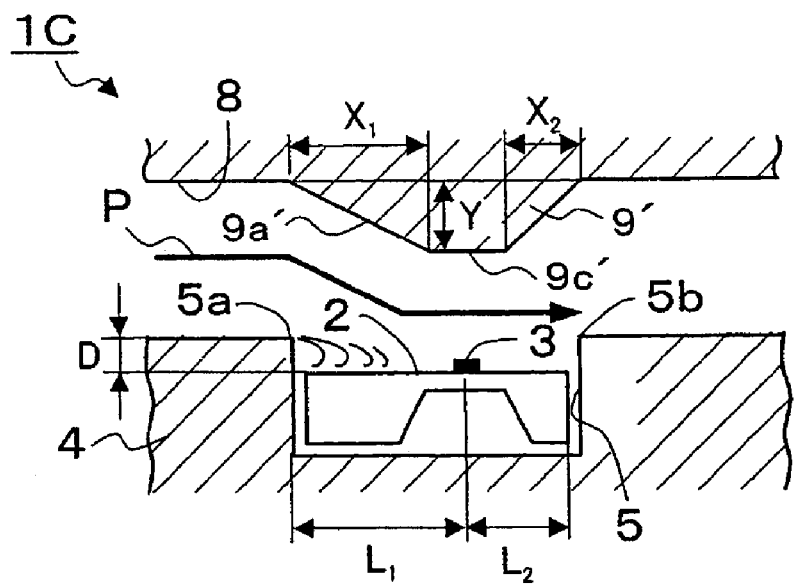
FIG. 7 is a cross-sectional view illustrating a main portion of the thermal type flow sensor according to a third embodiment of the present invention.

FIG. 7 shows a main portion of the thermal type flow sensor 1C according to a third embodiment of the present invention. In the thermal type flow sensor 1C of this embodiment, the components which correspond to those of the thermal type flow sensor 1A according to the first embodiment will be identified by the common symbols and differences in structure between these embodiments will be mainly explained in the following description. In this embodiment, the exothermic resistor 3 is positioned so as to off-set it from the center of the sensor element 2 toward the downstream side. Namely, when the distance between the upstream side upper edge 5a of the recessed portion 5 and the exothermic resistor 3 (the center thereof) is represented by "L1", and when the distance between the exothermic resistor 3 and the downstream side upper edge 5b of the recessed portion 5 is represented by "L2", they should be regulated to satisfy the expression of: L1>L2. In this constricted portion 9' which is formed on a wall portion of passage facing the sensor element 2, "Y" represents the height of gradient, "X1" represents the distance between the upstream side upper edge 5a and the upstream side edge of the narrowest portion, and "X2" represents the distance between the downstream side edge of the narrowest portion and the downstream side upper edge 5b. In this case, these distances should be regulated to satisfy the expression of: X1>X2.

By constructing the thermal type flow sensor 1C in this manner, it is possible to obtain the following advantages.

Namely, the intake air flow in the internal combustion engine such as an automobile engine is accompanied with a forward flow flowing toward the cylinder and a backward flow flowing in the opposite direction. However, most of the intake air flow is consisted of a forward flow. In this case, it is no longer required to provide the same measurement range in the opposite directions. Namely, with respect to the forward flow, it should be constructed such that the exothermic resistor 3 can be prevented from being affected by the peeling of flow even if the air flow is of high flow rates. With respect to the backward flow, it should be constructed such that the exothermic resistor 3 can be prevented from being affected by the peeling of flow only on the occasion where the air flow is of low flow rates. The peeling in fluid flow due to the step portion or the constricted portion would become more prominent as the magnitude of step portion becomes larger. Further, as the magnitude of constriction increases, the peeling would be caused to initiate even at lower flow rates. Therefore, since the constriction in the direction of backward flow can be made larger in gradient than that of the constriction in the direction of forward flow, thus satisfying the relationship of: X1>X2. Therefore, it is possible to miniaturize the sensor element 2, the measuring passageway, etc.

Fourth Embodiment

Figure 8:
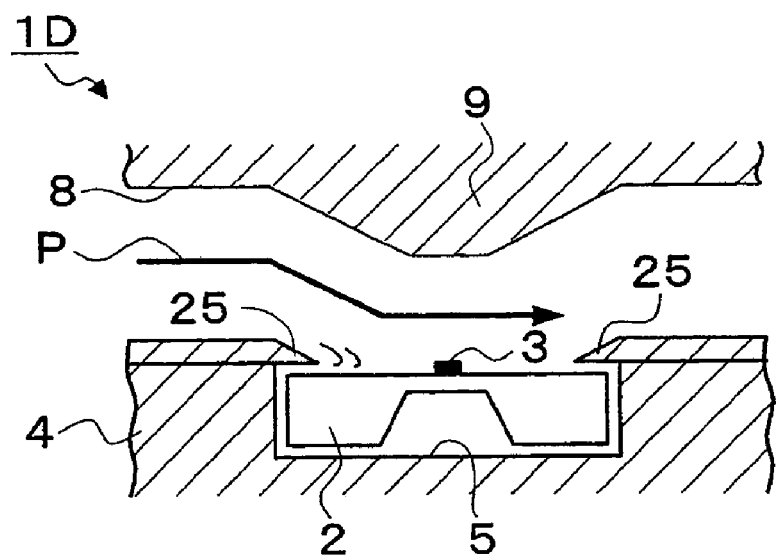
FIG. 8 is a cross-sectional view illustrating a main portion of the thermal type flow sensor according to a fourth embodiment of the present invention.

FIG. 8 shows a main portion of the thermal type flow sensor 1D according to a fourth embodiment of the present invention. In the thermal type flow sensor 1D of this embodiment, the components which correspond to those of the thermal type flow sensor 1A according to the first embodiment will be identified by the common symbols and differences in structure between these embodiments will be mainly explained in the following description. In this embodiment, eaves 25 are formed on the upstream side upper edge and the downstream side upper edge of the recessed portion 5 formed in the base portion 4, thereby reducing the opening area of the recessed portion 5. These eaves 25 are formed so as to extend over the sensor element 2. In this embodiment, a plate-like member having a through-hole is superimposed on the surface of the base portion 4 having the recessed portion 5, thereby creating these eaves 25. These eaves 25 are configured such that they become thinner from the proximal ends thereof to the distal ends thereof.

By constructing the thermal type flow sensor 1D in this manner, it is possible to obtain the following advantages. Namely, in this embodiment, it is possible to minimize the peeling of fluid flow due to the provision of the step portion as in the case of the second embodiment and, at the same time, it is possible to reduce the intrusion of fluid down to the underside of the sensor element 2. These eaves 25 are respectively configured such that the distal end thereof is made thinner to form a triangular cross-section and that the magnitude of the step portion formed between the surface of base portion 4 and the surface of sensor element 2 would become smaller. Therefore, since the measuring passage 8 is configured such that it changes gradually in configuration, the peeling in fluid flow would not be easily generated. Further, since these eaves are provided, the possibility of the fluid to enter into an interface between the base portion 4 and the sensor element 2 can be minimized.

Although the eaves 25 is formed on the upstream side as well as on the downstream side of the sensor 2 in this embodiment, the eaves 25 may be formed only on the upstream side. Further, although a plate-like member having a through-hole is superimposed on the surface of the base portion 4 in order to create these eaves 25 in this embodiment, these eaves 25 may be formed integral with the base portion 4.

The invention claimed is:

1. A thermal type flow sensor comprising: a measuring passage which is disposed in a main passage; a base portion provided along a flowing direction of a fluid passing through the measuring passage; and a sensor element mounted on the base portion and equipped with an exothermic resistor formed on a substrate;
   the thermal type flow sensor being featured in that a recessed portion is formed in the base portion, that the sensor element is fixedly fitted in the recessed portion in a manner that the surface of a detecting portion of the sensor element is positioned lower than an upper edge of the recessed portion, and that a wall portion of the measuring passage which is located to face the sensor element is constricted,
   wherein the constricted wall portion is configured to provide a constricted passage in the measuring passage such that a cross-sectional area of the measuring passage is gradually reduced to a narrowest portion of the constricted passage from an upstream side upper edge of the recessed portion to a downstream side thereof, and the exothermic resistor of the sensor element is mounted downstream of an upstream end of the narrowest portion of the constricted passage.

2. The thermal type flow sensor according to claim 1, wherein the surface of the detecting portion of the sensor element is set in relation to a distance between the upstream side upper edge of the recessed portion and a center of the exothermic resistor in such a way as to satisfy an expression of: $L>D \cdot \alpha$, wherein L is a distance between the upstream side upper edge of the recessed portion and a center of the exothermic resistor; D is a depth of a step portion between the upper edge of the recessed portion and the surface of the detecting portion of the sensor element; and $\alpha$ is an average gradient of the constricted wall portion.

3. The thermal type flow sensor according to claim 1, wherein the center of the exothermic resistor is spaced away, along the flowing direction of fluid, from the upstream side upper edge of the recessed portion by a distance of 1.5 mm or more.

4. The thermal type flow sensor according to claim 1, wherein the sensor element is mounted at a length of 3 mm or more as measured from the upstream side edge thereof to the downstream side edge thereof.

5. The thermal type flow sensor according to claim 1, wherein the center of the exothermic resistor is off-set from the center of the sensor element toward the downstream side.

6. The thermal type flow sensor according to claim 1, further comprising eaves projecting over the sensor element and extending along the flowing direction of fluid, the eaves being formed on at least one of the upstream side upper edge and the downstream side upper edge of the recessed portion.

7. The thermal type flow sensor according to claim 6, wherein the eaves are formed to have a tapered surface extending downward from proximal ends thereof.

8. A thermal type flow sensor comprising: a sub-passage for enabling part of a fluid to pass therethrough; a base portion provided in the sub-passage and along a flowing direction of the fluid passing through the sub-passage; and a sensor element mounted on the base portion and equipped with an exothermic resistor formed on a substrate;
   the thermal type flow sensor being featured in that a rectangular recessed portion is formed in the base portion, that the sensor element is fixedly fitted in the recessed portion in a manner that the surface of a detecting portion of the sensor element is positioned lower than an upper edge of the recessed portion, and that a wall portion of a measuring passage in the sub-passage which is located to face the sensor element is constricted, wherein the constricted wall portion is configured to provide a constricted passage in the measuring passage such that a cross-sectional area of the measuring passage is gradually reduced to a narrowest portion of the constricted passage from an upstream side upper edge of the recessed portion to a downstream side thereof, and the exothermic resistor of the sensor element is mounted downstream of an upstream end of the narrowest portion of the constricted passage.

9. The thermal type flow sensor according to claim 8, wherein the sub-passage is provided with at least one constricted portion midway between the upstream end of the sub-passage and the recessed portion, and upstream of the constricted wall portion.

* * * * *